R. CHAPMAN.
Cotton-Planter.
No. 30,388.  Patented Oct. 16, 1860.
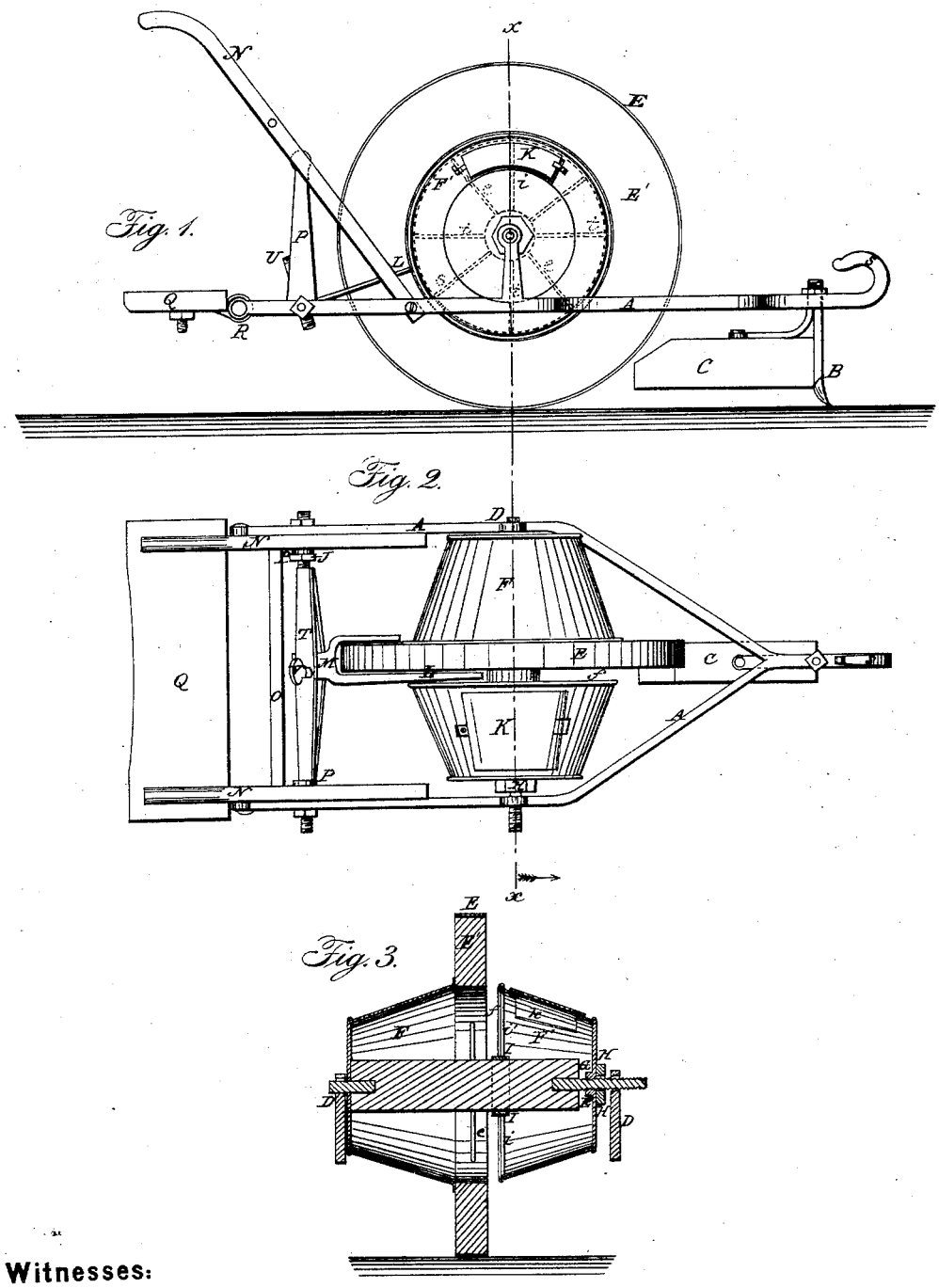
Witnesses:
G. A. C. Smith
J. H. Phillips
Inventor:
Rowland Chapman

UNITED STATES PATENT OFFICE.

ROWLAND CHAPMAN, OF DARLINGTON DISTRICT, SOUTH CAROLINA.

IMPROVEMENT IN SOWING-MACHINES.

Specification forming part of Letters Patent No. 30,388, dated October 16, 1860.

*To all whom it may concern:*

Be it known that I, ROWLAND CHAPMAN, of Darlington District, in the State of South Carolina, have invented a new and useful machine for drilling, distributing, and covering guanos and other fine fertilizers, and for planting and covering cotton and other seeds; and I do hereby declare that the following is a full, clear, and exact description of the construction and operation of the same, reference being had to the annexed drawings, making a part of this specification, in which—

Figure 1 is a side elevation of the machine. Fig. 2 is a plan view, and Fig. 3 is a section of the axle through the line $x\ x$.

The nature of my invention consists in the hereinafter-described combination of devices for drilling, distributing, and covering guanos and other fertilizers and planting and covering cotton and other seeds.

To enable others skilled in the art to make and use my invention, I will proceed to describe its construction and operation.

In the drawings, to which reference is had, A is the frame; B, the furrow-opener, secured to the frame by passing through a hole in the frame, and screwed down by a tap on the upper side, for the purpose of opening the furrow to drill the guanos or other fine fertilizers and to receive the cotton or other seeds.

C is the furrow-smoother, attached to the furrow-opener by braces $c\ c$. The furrow-smoother follows after the furrow-opener, by means of which the furrow itself is smoothed down on each side and a narrow trench formed at the bottom for the reception of the guanos or other fine fertilizers and cotton or other seeds. The furrow-smoother is joined to the furrow-opener in such a way that they together resemble somewhat the bow of a boat, and thereby pass through the soil more easily.

D D are uprights secured to the frame, and extending upward for the axle of the wheel to run in, and at the same time to lower the frame itself, so as to diminish the length of the furrow-opener, whereby the same is greatly strengthened.

E is the wheel, with four spokes, E E E E, in the center of the frame, having a rim, E′, which aids in distributing the guano or other fine fertilizers and cotton or other seed. The spokes are useful in stirring up the guano or seed for the purpose of their being distributed, acting in connection with the spur hereinafter described, and the conical cylinders.

F F′ are cylinders (each in the form of a truncated cone) attached to the axle of the wheel E and revolving with the same, F being attached to the rim of the wheel E on one side, and F′ on the other side being so connected with the axle as to increase or diminish the distance between the rim of the wheel E and the rim of the cylinder F′, and thereby regulating—*i.e.*, enlarging or contracting—the opening $f$, through which the guanos or other fine fertilizers and cotton or other seed are distributed along the bottom of the furrow previously made by the opener and smoother.

F′ is made to slide upon the axle to or from the wheel E by means of a tap playing on a thread cut in the gudgeon at the end of the axle, which tap is protected from dirt by the movable collar inclosing the same.

G is the tap for regulating the cylinder F′, as just described, and is fastened to it.

H is the movable collar or band encircling the axle and sliding on the same, so as to cover or protect the tap G from dirt or dust, and the collar is attached to the end of the cylinder with the tap.

I is the ring to which the spokes $i\ i\ i\ i$ of the cylinder F′ are fastened and slides on the axle, thus facilitating the movement of the cylinder F′ on the axle to and from the rim E′ for the purpose of increasing the opening $f$.

J is a tap for the purpose of widening the frame A, and is used, in connection with the tap G, to regulate the opening $f$, and also to regulate the brace T.

K is a door or opening by which the guanos or other fertilizers or seeds are deposited in the cylinders F F′ for the purpose of distribution.

L is a spur attached to the frame by a thumb-screw, and projecting into the cylinders through the opening $f$ to regulate, in connection with the spokes $e\ e\ e\ e\ i\ i\ i\ i$, the distribution of the fertilizers or seeds along the furrows.

M is a fork to keep the wheel free from dirt.

N N are the handles, which are attached to the frame by means of bolts and braces fastened on the cross-piece of the frame and to the handles.

O is the round in the handles.

P P are the braces fastened on the cross-piece of the frame and to the handles.

Q is the furrow-coverer to fill in the furrow, and thus cover up the fertilizers or seeds after they have been deposited at the bottom of the furrow. The furrow-coverer is attached to the frame by hinges, and may be of wood or iron, and may be turned up against the handles when it is not wanted for use.

R R are the hinges by which the furrow-coverer is attached to the frame.

S is an iron hook on which to fasten the single-tree when the machine is used in the field.

T is a brace so fastened to the frame at each end by taps that it may be turned, so as to elevate or lower the point of the spur L, thereby increasing or diminishing the quantity of guano or seeds deposited in the furrow.

U is a thumb-screw governing the spur L, and by means of which the spur may be lengthened or shortened, according as it may be desired to increase or diminish the quantity of guano or seeds deposited.

The operation of my machine for drilling, distributing, and covering guanos and other fine fertilizers, and for planting and covering cotton and other seeds, is as follows:

The guanos or fine fertilizers and cotton-seeds are first put into the cylinders in a suitable quantity. Where cotton or other seeds are to be drilled the cylinders may be nearly full; but for drilling guanos or other fertilizers the cylinders should not be more than two-thirds full. When the machine starts in the field the furrow-opener, by throwing up the soil on either side, prepares the way for the smoother, which presses out the sides of the furrow, making them smooth, and at the same time forming a narrow trench at the bottom of the furrow, where the seeds or fertilizers are deposited in a straight line. The cylinders revolve with the wheel, and by means of their rotatory motion and the joint operation of the two sets of spokes and the spur inside the cylinders the fertilizers or seeds placed in the cylinders are stirred up and caused to drop through the opening into the trench. The conical shape of the cylinders also gives the seed or fertilizers a tendency, when the cylinders revolve, to settle or move in the direction of the opening. The quantity deposited, whether of fertilizers or seeds, is regulated by the opening between the cylinder and rim of the wheel, just referred to, which opening may be increased or diminished at any time by turning the cylinder having the spokes either backward or forward, there being a tap fastened to said cylinder and playing around the thread on the gudgeon for that purpose. The quantity deposited is also further regulated by lowering or elevating, shortening or lengthening the spur, at the same time the opening is increased or diminished. The spur is shortened or lengthened by means of the thumb-screw, which allows the spur to slide to or from the cylinders, and the spur is elevated or depressed by turning the brace in the rear of the frame, to which it is attached. This brace is turned by loosening the tap at either end of the brace. After the fertilizers or cotton-seed are deposited in the trench the furrow-coverer fills in the dirt upon the same, covering them to a sufficient depth, and by means of its peculiar construction it is readily adapted to any unevenness in the ground, and leaves a ridge of earth above the furrow it has covered.

What I claim as new and of my own invention, and for which I desire to obtain Letters Patent, is—

The arrangement of the frame A, the furrow-opener B, the furrow-smoother C, the uprights D D, the wheel E, and the spokes $e\ e\ e\ e$, operating in conjunction with the spokes $i\ i\ i\ i$, the spur L, tap G, and ring I, the whole being constructed for operation conjointly in the manner and for the purpose herein set forth.

ROWLAND CHAPMAN.

Witnesses:
 HIRAM B. CROSBY,
 EDWARD HARLAND.